US006785131B2

(12) United States Patent
Ewell et al.

(10) Patent No.: US 6,785,131 B2
(45) **Date of Patent: *Aug. 31, 2004**

(54) COMPUTER SYSTEM AND DOCUMENTATION ARRANGEMENT FOR GUIDING SYSTEM INSTALLATION

(75) Inventors: Michelle Ewell, Austin, TX (US); Beryl Hamilton Horton, Austin, TX (US)

(73) Assignee: Dell Products, L.P., Round Rock, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 547 days.

(21) Appl. No.: 09/428,364

(22) Filed: Oct. 28, 1999

(65) Prior Publication Data

US 2002/0058439 A1 May 16, 2002

(51) Int. Cl.[7] .................... H01R 3/00; G06F 1/16; B26D 1/00; B26D 3/00

(52) U.S. Cl. .................... 361/686; 439/488; 439/491; 361/683; 83/36; 83/41; 83/70; 40/360; 40/641

(58) Field of Search .................... 439/491, 488; 361/683, 686; 29/426.2; 709/327; 283/36, 37, 41, 70, 74; 40/360, 641

(56) References Cited

U.S. PATENT DOCUMENTS

| | | | | | |
|---|---|---|---|---|---|
| 3,610,810 | A | * | 10/1971 | Fribley, Jr. | 174/59 |
| 5,230,133 | A | | 7/1993 | Esposito | 29/426.2 |
| 5,340,326 | A | * | 8/1994 | LeMaster | 439/207 |
| 5,487,666 | A | * | 1/1996 | DiGiovanni | 434/72 |
| 5,661,631 | A | * | 8/1997 | Crane, Jr. | 361/683 |
| 5,821,510 | A | * | 10/1998 | Cohen et al. | 235/375 |
| 5,822,182 | A | | 10/1998 | Scholder | 361/683 |

OTHER PUBLICATIONS

Amiga Vision Authoring System manual, 1990, Commodore Electronics Limited, Chapter 6.*

* cited by examiner

*Primary Examiner*—Michael C. Zarroli
(74) *Attorney, Agent, or Firm*—Russell D. Culbertson; The Culbertson Group, PC

(57) ABSTRACT

A computer system includes a plurality of installation code elements (40, 41, 42, 43, 44, 45, 46, 47). Each installation code element is associated with a particular system connector (11, 12, 13, 14, 19, 24, 25*a,* 25*b*) and the respective external connector (31, 32, 33, 34, 35, 36*a,* 36*b,* 37) which connects with the particular system connector. The installation code element marks both the respective system connector and associated external connector, and also marks the installation documentation (51) included with the system. This installation documentation contains a plurality of information sections (52, 53, 54, 55, 56, 57, 58, 59), with each information section providing information relating to making the connection between a particular system connector and its corresponding external connector. Each information section is marked with the same installation code element which also marks the system connector and external connector to which the information section pertains.

20 Claims, 4 Drawing Sheets

COMPUTER SYSTEM AND DOCUMENTATION ARRANGEMENT FOR GUIDING SYSTEM INSTALLATION

TECHNICAL FIELD OF THE INVENTION

This invention relates to computer systems and, more particularly, to an arrangement for marking computer system components and documentation to guide a user in installing or setting up the computer system. The invention also includes a method for marking computer system components and documentation to guide system installation.

BACKGROUND OF THE INVENTION

Personal computers and other computer systems commonly include a system housing which contains the processor and other basic system components. A computer system also commonly includes a number of peripheral devices such as a keyboard, mouse, monitor, and speakers, for example, which are external to the system housing. These peripheral devices are connected to the system housing by making a connection between a peripheral connector associated with the peripheral device and a system connector included with the system housing. Individual computer systems are also commonly connected to communicate with other computers through various communications lines. These communications lines, including dedicated network lines and telephone lines, also include connectors which connect to system connectors associated with the system housing.

Computer systems are commonly shipped in a partially disassembled state, with the peripheral devices disconnected from the system housing. Of course, network and other communications connections may be made only at the location at which the system will be used. The user must set up or install the computer system by making the various connections with the peripheral devices and communication lines. Once all of the hardware is properly connected, the user commonly must also run set-up software associated with the system.

Although many computer users are well versed in computer systems and their various components, many users may have no particular education or experience with computer systems or with system installation. In any event, when a user encounters an installation problem or when the installation procedures are unclear, the user commonly calls for support from the system manufacturer or seller. These installation support calls represent a costly burden on the seller's or manufacturer's support resources. Also, problems with system installation may lead to customer dissatisfaction. Thus, it is desirable to simplify the installation procedures as much as possible, and provide a simple installation guiding arrangement to enable even a novice computer user to install the system without requiring support.

SUMMARY OF THE INVENTION

It is an object of the invention to provide a computer system and documentation arrangement for guiding a user in setting up the computer system. Another object of the invention is to provide a method of marking a computer system and related documentation to help guide the user in system installation.

A computer system embodying the principles of the invention includes a plurality of installation code elements. Each installation code element is associated with a particular system connector and the respective external connector which connects with the particular system connector. The installation code element marks both the respective system connector and associated external connector, and also marks the installation documentation included with the system. This installation documentation contains a plurality of information sections, with each information section providing information relating to making the connection between a particular system connector and its corresponding external connector. According to the invention, each information section is marked with a section identifying heading that includes the same installation code element which also marks the system connector and external connector to which the information section pertains.

Consistently marking a common installation code element on the cooperating connectors and the documentation makes the installation steps easier for the user to understand and follow. Thus, the arrangement reduces installation problems which arise from user confusion with the system installation instructions.

As used in this disclosure and the accompanying claims, the terms "external device" will be used generically to describe a device which must be connected to the computer system housing. An external device may comprise a peripheral device such as a keyboard, mouse, or monitor, or may comprise a communication line or power supply cord. The terms "external connector" will be used to describe the connector associated with an external device. For example, an external connector may comprise a connector or plug associated with a peripheral device or a connector associated with a communications line or power cord. Finally, the terms "system connector" will be used to describe a connector included on or in the system housing. A system connector, then, may include a connector integrated in the system or a connector included in an option or expansion card mounted within the system housing.

The installation code elements may comprise a numerical code, color code, graphic representation, or a combination of any of these types of elements. Regardless of the form of the installation code element, the code elements may mark the system connectors in any suitable fashion. Numerical or graphic representations may be stamped, molded, or otherwise formed on the respective connector or adjacent to the respective connector. Alternatively, the installation code elements may be marked on labels which are attached to the respective connector or attached adjacent to the respective connector. Where the installation code elements include a numerical code, the numerical values may be arranged in ascending order comprising a preferred sequence of installation steps.

These and other objects, advantages, and features of the invention will be apparent from the following description of the preferred embodiments, considered along with the accompanying drawings.

DESCRIPTION OF THE PREFERRED EMBODIMENTS

Figure 1:
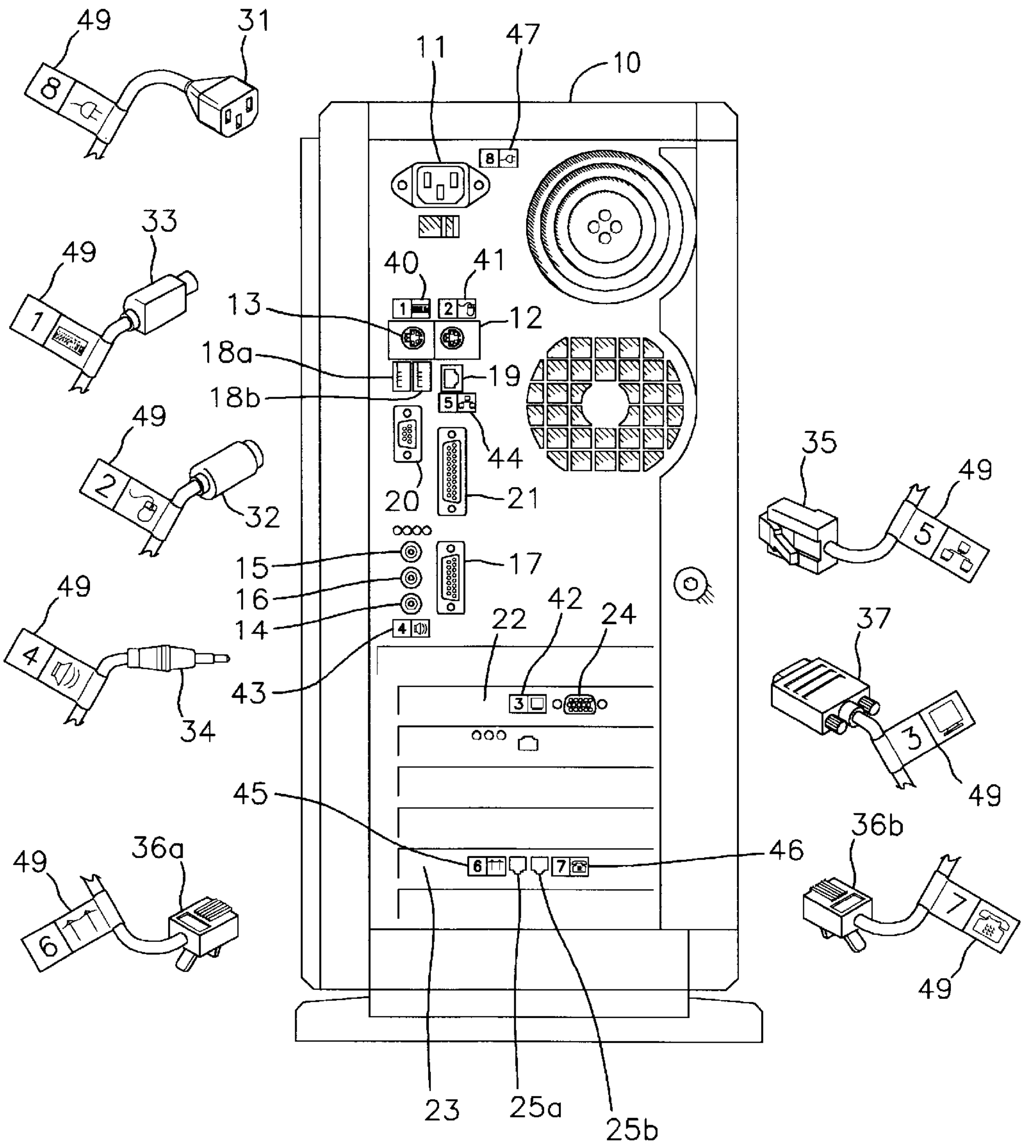
FIG. 1 is a view in elevation of a computer system housing along with several external connectors, each external connector and each system connector being marked with an installation code element embodying the principles of the invention.

Referring to FIG. 1, a computer system includes a system housing 10 which contains basic system components such as the system processor or processors, random access memory, hard drives, CD drives, and support equipment such as cooling fans. All of these elements are common computer system components and are omitted from FIG. 1 so as not to obscure the invention in unnecessary detail. System housing 10 also includes a number of system connectors including a power supply socket 11 and several integrated input/output connectors. The integrated input/output connectors include a mouse connector socket 12, a keyboard connector socket 13, a speaker connector socket 14, an audio input connector socket 15, a microphone connector socket 16, a joy stick connector socket 17, universal serial bus connector sockets 18*a* and 18*b*, a network connector socket 19, a serial port 20, and a parallel port 21. System housing 10 also houses option cards or expansion cards which may also include system connectors. The illustrated option cards comprise a video card 22 and a modem card 23. Video card 22 includes a monitor socket 24 while the modem card includes a telephone line in socket 25*a* and a telephone line out socket 25*b*. Monitor socket 24 and telephone line sockets 25*a* and 25*b* each represent additional system connectors.

FIG. 1 also shows a plurality of external device connectors including power cord connector 31 and a number of peripheral device connectors. The peripheral device connectors include a mouse plug 32, keyboard plug 33, speaker plug 34, network plug 35, telephone line plugs 36*a* and 36*b*, and monitor connector plug 37. Each external device connector is adapted to form a connection with a particular system connector. For example, keyboard plug 33 connects with keyboard socket 13 while mouse connector plug 32 is adapted to connect with mouse socket 12. Power cord connector 31 is adapted to connect to power supply socket 11.

Referring still to FIG. 1, the apparatus according to the invention includes a plurality of installation code elements shown at references numerals 40 through 47. The illustrated installation code elements include both a numerical code and also a graphic representation. In other forms of the invention, each installation code element may comprise a color code or any combination of numerical codes, graphic representations, or color codes.

Keyboard socket 13 is marked with installation code element 40 comprising the numerical code "1" and a graphic representation of a keyboard. Mouse socket 12 is marked with installation code element 41 comprising numerical code "2" and a graphic representation of a mouse. Monitor socket 24 is marked with installation code element 42 comprising numerical code "3" and a graphic representation of a monitor. Speaker socket 14 is marked with installation code element 43 comprising numerical code "4" and a graphic representation of a speaker. Installation code element 44, comprising the number "5" and a graphic representation of a network, marks network connector socket 19. While installation code elements 45 and 46, also both a number and a graphic representation, mark the telephone-in socket 25*a* and telephone out socket 25*b*, respectively. Finally, power supply socket 11 is marked with installation code element 47 comprising number "8" and a graphic representation of a power plug. As shown in these illustrations, each graphic representation is preferably indicative of the external device to which the particular system connector is adapted to connect. The identical installation code elements 40 through 47 also mark each external connector. The particular installation code element with each respective external connector coincides with the installation code element which marks the particular system connector with which the respective external connector is adapted to connect. In particular, keyboard plug 33 is marked with installation code element 40 comprising the number "1" and a graphic representation of a keyboard. Due to the size of some of the plugs, the peripheral connectors are marked with a label such as label 49 on the keyboard plug and containing code element 40. However, the external connectors could be marked by stamping, molding, or otherwise forming the particular installation code into the body of the respective external connector itself. Regardless of the manner in which the components are marked, FIG. 1 shows that mouse plug 32 is marked with code element 41, monitor connector plug 37 is marked with code element 42, speaker plug 34 is marked with code element 43, telephone line-in plug 36*a* is marked with code element 45, telephone line-out plug 36*b* is marked with code element 46, and power cord element 31 is marked with code element 47. It will be noted that FIG. 1 shows network connector plug 35 marked with installation code element 44 and line-out plug 36*b* marked with code element 46. However, those skilled in the art will appreciate that the network connector 35 and line-out plug 36*b* may not be shipped with the computer system, but comprise separate items already in place at the user location or otherwise provided by a third party. In these cases it may not be possible to mark the network connector 35 or line-out plug 36*b* with the respective installation code element.

Figure 2A:
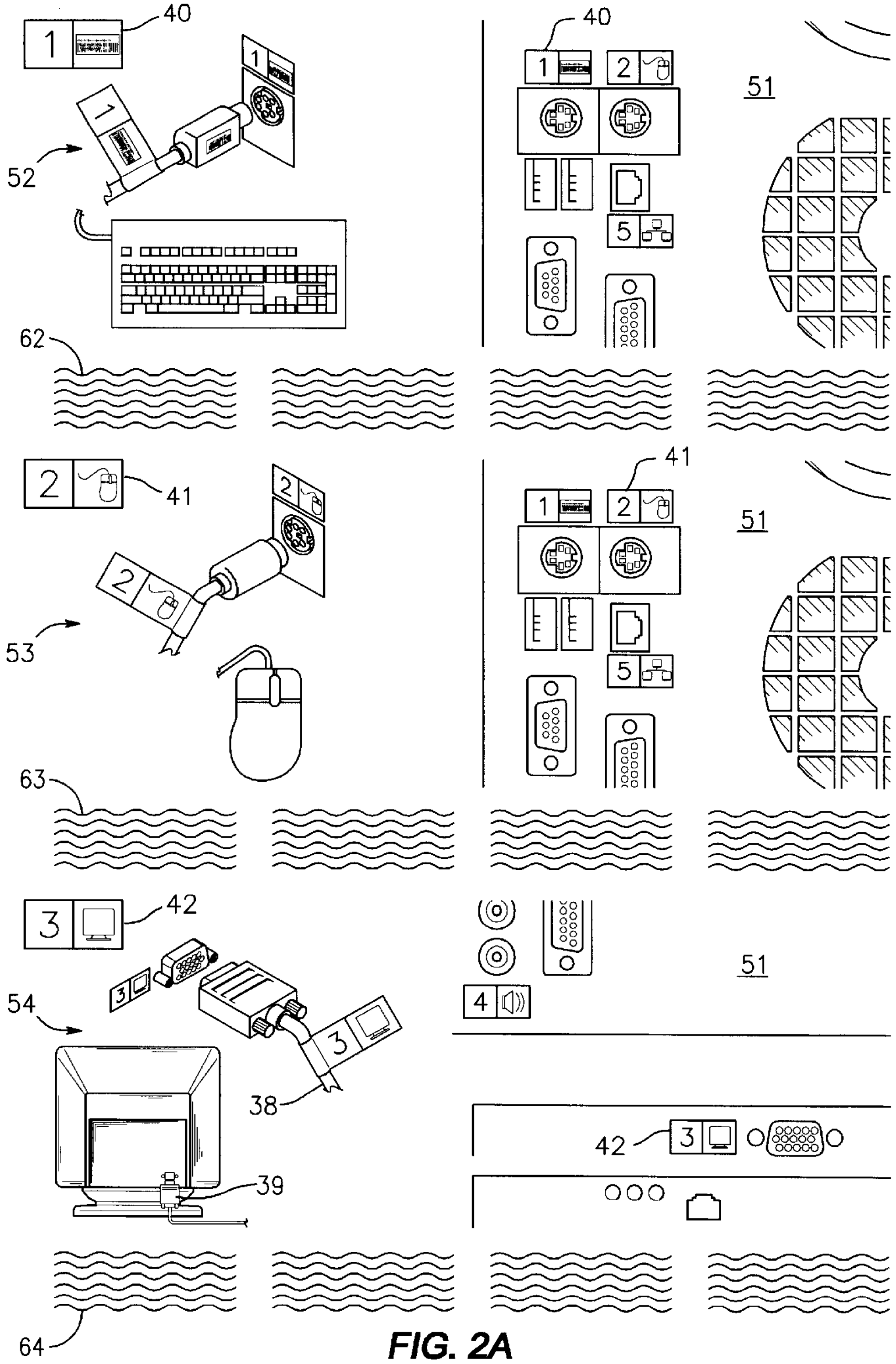
FIGS. 2A, 2B, and 2C each comprises a representation of installation documentation which accompanies the computer system shown in FIG. 1.
Figure 2B:
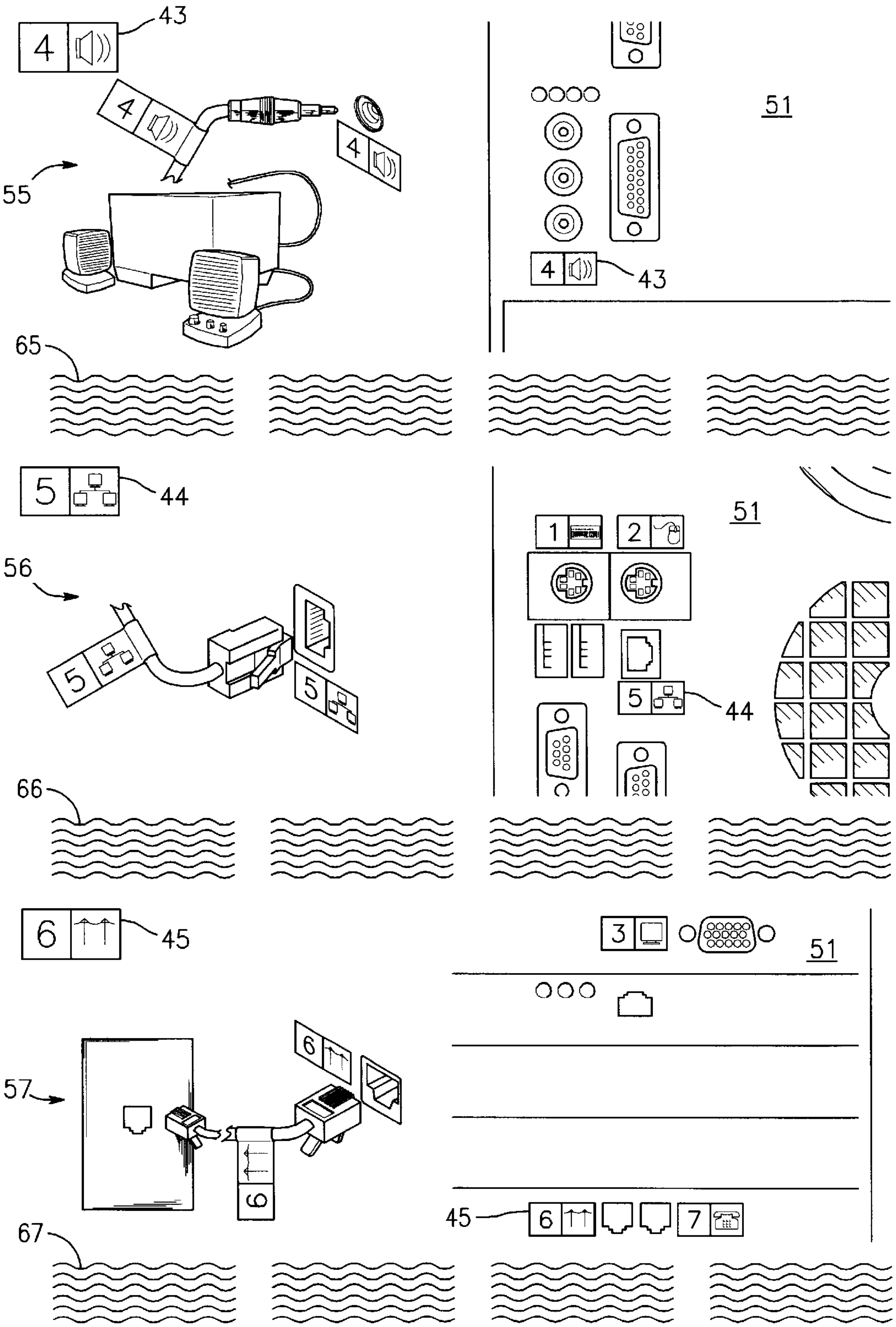
Figure 2C:
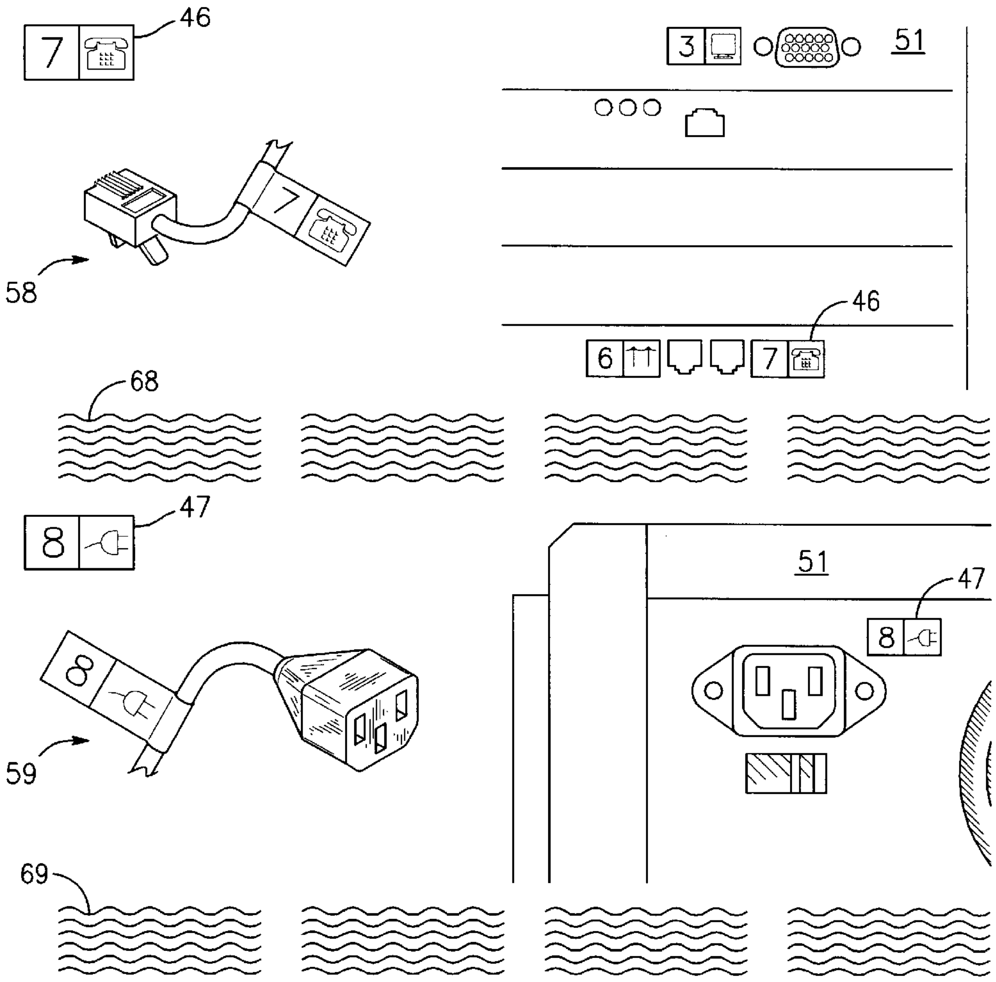

Referring now to FIGS. 2A, 2B, and 2C, the computer system including housing 10 is accompanied by installation or set up documentation shown at reference numeral 51. Installation documentation 51 includes a plurality of information sections shown at reference numerals 52 through 59. Each respective information section includes information on making a particular connection between a system connector and its respective external connector. According to the invention, each information section is marked with a section identifying heading that includes the same installation code element used to mark the system connector and external device connector to which the information section pertains. For example, referring to FIG. 2A, information section 52 is marked in the upper left hand corner with a section identifying heading comprising the number "1" together with the graphic keyboard representation (which also make up the installation code element 40). This information section includes information on connecting keyboard plug 33 to keyboard socket 13. Continuing with this example, information section 52 preferably contains graphic representations showing how the connection is made and also contains text, shown generally at reference numeral 62, describing the particular step. This text may be provided in several languages which allows the same documentation to be shipped to geographic regions in which different primary languages are used. It will be noted that the section identifying heading comprising the installation code element 40 in the upper left hand corner of information section 52 is separate from and in addition to any representation of the installation code element appearing in the graphic representation illustrating how the connection is made.

Where, as in the illustrated form of the invention, the installation code elements include a numerical value, the code elements and information sections are preferably arranged in ascending numerical order and follow a preferred installation sequence. As shown in FIGS. 2A, 2B, and 2C, the keyboard connection comprises the preferred first step followed by the mouse connection, monitor connection, speaker connection, network connection, telephone line in connection, telephone line out connection, finally the power connection in that order.

Referring still to FIG. 2A information section 53 includes information on connecting the mouse connector 32 and is marked in the upper left hand corner with a section identifying heading comprising the installation code element 41 which includes the number "2" and mouse representation. Information section 53 also includes text 63. Information on connecting the monitor connector 37 is contained in information section 54 marked in the upper left hand corner with a section identifying heading comprising the installation code element 42 made up of the number "3" and the monitor representation. This information section 54 includes text 64. It will be noted that the monitor cord 38 which includes monitor connector plug 37 also includes plug 39 which is adapted to connect to the monitor. In this case, plug 39 and the corresponding socket on the monitor may also be marked with the same installation code element 42, or a different code element indicating that the connection to the monitor is a separate step.

FIG. 2B shows information sections 55, 56, and 57, relating to connecting the speaker plug 34, network plug 35, and telephone line-in plug 36*a*, respectively. Section 55 is marked with a section identifying heading comprising the installation code element 43, section 56 is marked with a section identifying heading comprising the code element 44, and information section 45 is marked with a section identifying heading comprising the code element 45. These code elements are preferably identical to the code elements which mark the respective system connectors and external device connectors. Each section 55, 56, and 57 includes text 65, 66, and 67, respectively, providing guidance on making the respective connection.

Referring now to FIG. 2C, information section 58 includes information on making the telephone line-out connection, while information section 59 includes information on making the power connection. Section 58 includes text 68 and is marked with a section identifying heading comprising the code element 46, and section 59 includes text 69 and is marked with a section identifying heading comprising code element 47.

The installation documentation may be provided in several different forms. In one form of the invention, the information may be printed on a large fold out document commonly referred to as a placemat. Alternatively, or in addition to the placemat, the installation documentation may be printed in a system manual. Each of these arrangements for providing the installation documentation is to be considered equivalent and encompassed within the term "installation documentation" used in the accompanying claims.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A computer system and installation documentation arrangement comprising:

(a) a computer system housing having a plurality of system connectors;

(b) a plurality of external devices, each respective external device having an external connector adapted to connect with a different one of the system connectors;

(c) a plurality of installation code elements, each respective installation code element being associated with a different one of the system connectors, the respective installation code element marking the respective system connector with which the code element is associated, and also marking the respective external connector adapted to connect with the respective system connector; and (d) installation documentation having a plurality of information sections, each information section containing information pertaining to making the desired connection between one of the system connectors and the respective external connector, each information section also being marked with a section identifying heading that includes the installation code element which marks the respective system connector and respective external connector to which the information section pertains.

2. The computer system of claim 1 wherein each installation code element comprises a numerical code.

3. The computer system of claim 1 wherein the plurality of information sections are arranged in the installation documentation in a preferred order of installation.

4. The computer system of claim 3 wherein each installation code element comprises a numerical code and the information sections are arranged in ascending numerical order representing the preferred order of installation.

5. The computer system of claim 1 wherein each installation code element comprises a particular color.

6. The computer system of claim 1 wherein each installation code element includes a graphic representation indicative of the external device associated with the respective external connector.

7. The computer system of claim 1 wherein the respective installation code element is formed in material adjacent to the respective system connector and is also formed in material adjacent to the respective external connector.

8. The computer system of claim 1 wherein the respective installation code element is printed on a label affixed adjacent to the respective system connector and a label affixed adjacent to the respective external connector.

9. In a computer system having a system housing and a plurality of external devices, each external device having a respective external connector adapted to make a connection with a particular system connector associated with the system housing, an installation guide arrangement comprising:

(a) a plurality of installation code elements, each respective installation code element being associated with a different one of the system connectors, the respective installation code element marking the respective system connector with which the code element is associated, and also marking the respective external connector adapted to connect with the respective system connector; and (b) installation documentation having a plurality of information sections, each information section containing information pertaining to making the desired connection between one of the system connectors and the respective external connector, each information section also being marked with a section identifying heading that includes the installation code element which marks the respective system connector and respective external connector to which the information section pertains.

10. The computer system of claim 9 wherein each installation code element comprises a numerical code.

11. The computer system of claim 9 wherein the plurality of information sections are arranged in the installation documentation in a preferred order of installation.

12. The computer system of claim 11 wherein each installation code element comprises a numerical code and the information sections are arranged in ascending numerical order representing the preferred order of installation.

13. The computer system of claim 9 wherein each installation code element comprises a particular color.

14. The computer system of claim 9 wherein each installation code element includes a graphic representation indicative of the external device associated with the respective external connector.

15. The computer system of claim 9 wherein the respective installation code element is formed in material adjacent to the respective system connector and is also formed in material adjacent to the respective external connector.

16. The computer system of claim 9 wherein the respective installation code element is printed on a label affixed adjacent to the respective system connector and a label affixed adjacent to the respective external connector.

17. A method of marking computer system components and related documentation to facilitate installation, the computer system components including a system housing having a plurality of system connectors and also including a plurality of external devices, each external device having an external connector adapted to make a connection with a particular one of the system connectors, the documentation including a plurality of information sections with each different section containing information pertaining to making the connection between a particular system connector and the respective external connector, and the method comprising the steps of:

(a) marking each system connector with a different installation code element;

(b) marking each respective external connector with the respective installation code element which marks the respective system connector with which the respective external connector is adapted to connect; and (c) labeling each information section with a section identifying heading that includes the respective installation code element which marks the respective system connector and respective external connector to which the information section pertains.

18. The method of claim 17 wherein each installation code element comprises a numerical value.

19. The method of claim 17 wherein each installation code element comprises a particular color.

20. The method of claim 17 wherein each installation code element comprises a graphical representation indicative of the external device associated with the respective external connector.

* * * * *